United States Patent [19]

Samodovitz

[11] Patent Number: 4,480,476
[45] Date of Patent: Nov. 6, 1984

[54] PROCESS FOR CAUSING AN INTERFACE TO VIBRATE AND THEN TRUNCATING RESULTING RINGING

[76] Inventor: Arthur J. Samodovitz, 67 Overbrook Dr., Colonia, N.J. 07067

[21] Appl. No.: 463,131

[22] Filed: Feb. 2, 1983

Related U.S. Application Data

[63] Continuation-in-part of Ser. No. 277,139, Jun. 24, 1981, abandoned.

[51] Int. Cl.³ .......................................... G01N 29/00
[52] U.S. Cl. ...................... 73/627; 73/629; 73/642
[58] Field of Search .................. 367/41, 48, 23, 87, 367/25, 34, 37; 73/629, 632, 642, 627

[56] References Cited

U.S. PATENT DOCUMENTS 4,333,347  6/1982  Lang et al. ........................... 73/642

Primary Examiner—Howard A. Birmiel

[57] ABSTRACT

The invention is useful in the field of diagnostic ultrasound to improve the axial resolution of an image. One embodiment comprises a transmitted, ultrasonic wave with two parts. The first part interacts with a specimen to initiate an echo, and the second part arrives out-of-phase with the ringing of the specimen and interferes to suppress the ringing. Another embodiment comprises a transmitted, electrical signal with two parts which interact as described above to cause a piezoelectric transducer to produce a transmitted, ultrasonic wave with truncated ringing.

20 Claims, 14 Drawing Figures

PROCESS FOR CAUSING AN INTERFACE TO VIBRATE AND THEN TRUNCATING RESULTING RINGING

CROSS REFERENCE TO RELATED APPLICATIONS

This is a continuation-in-part of the invention, "Ringing Termination Process" filed June 24, 1981, Ser. No. 277,139, now abandoned, by Arthur Samodovitz.

FIELD OF THE INVENTION

The invention relates to acoustic imaging, and more particularly to ultrasonic or electrical waveforms useful in diagnostic ultrasound to improve the axial resolution of an image of a specimen.

BACKGROUND AND DESCRIPTION OF THE PRIOR ART

Ultrasound is currently used to generate images of the flesh and organs of the body. A standard imaging device includes a transmitter, composed of electronic circuitry and a piezoelectric transducer. The transmitter transmits acoustical waves into the body, and these waves travel through the flesh and organs, and cause echoes from every location where the density of the tissue changes, the tissue interfaces. Some of these echoes travel back towards the transducer and input to a receiver. The receiver includes the transducer previously mentioned (it is bi-directional), and electronic circuitry. The transducer, in the receiving mode, converts the echoes to electrical signals, and the receiving electronic circuitry amplifies these electrical signals.

The echoes from any one tissue interface have the shape of a mildly damped sine wave and thus, require several cycles to dissipate, or ring down. Due to the lengthy ring down period, a problem arises when two tissue interfaces are located close together. In this situation, the transmitted wave strikes the nearer tissue interface first and causes a protracted echo. Soon afterwards, the transmitted wave (which still has retained most of its energy) strikes the second interface and causes a second, protracted echo. The second echo travels back towards the first interface which is still ringing and producing an echo. Since the first interface is still producing an echo, the two echoes combine vectorily and make a waveform which is not characteristic of either tissue interface. The combined echoes cause a distorted image of the first and second tissue interfaces.

The prior art consists mainly of techniques to make the duration of the transmitted wave shorter since the tissue will begin to stop vibrating when the excitation wave ceases. One such technique is to electrically match the transducer.

Another technique is to utilize mechanical matching layers on the transducer to facilitate the flow of ultrasound through the transducer and to decrease reverberations.

Thirdly, the piezoelectric crystal or material can be produced so that the transducer has a high bandwidth.

However, the problem with these three techniques is that they do not decrease the ringing tendency of the tissue and so, are limited in their ability to shorten the duration of the echo. Also, these techniques do not reduce the ringing of the transducer enough.

Another prior art system, Kalman Filtering, involves: transmission of a standard, protracted ultrasonic wave, receipt of standard, overlapping or "convoluted" echoes, conversion of these convoluted echoes in the normal manner to electrical signals, and finally, use of a computer to process the electrical signals to "de-convolute" the electrical signals to resolve the closely-spaced tissue interfaces. Thus, Kalman filtering does not deviate from conventional process of transmission of waves and receipt of echoes; rather, it involves subsequent processing by a computer. The problem with Kalman Filter is that the computer is expensive and complicated, and the process has not yet proven effective in practice.

SUMMARY OF THE INVENTION

The first object of the invention is to excite a tissue interface with a certain ultrasonic wave, and cause an echo with truncated ringing so that echoes from closely spaced tissue interfaces will not overlap.

The second object of the invention is to excite a piezoelectric transducer with certain electrical signals so that the transducer will transmit a mechanical wave with truncated ringing.

The third object of the invention is to excite a piezoelectric transducer with certain electrical signals so that the transducer will transmit ultrasonic waves which later excite a tissue interface and cause echoes with curtailed ringing.

The fourth object of the invention is to provide means to examine a target, such as part of a human being, with ultrasound, and yield an image with good axial resolution.

To satisfy these objects, and others which will become apparent later in the disclosure, there are provided a series of electrical waves which can be used to excite the transducer, and cause the transducer to produce a single, truncated ultrasonic wave. By its short duration, it will cause echoes of relatively short duration.

Other electrical signals cause the transducer to produce an ultrasonic wave which later causes an echo with truncated ringing.

There are also provided a series of ultrasonic waves which can be transmitted by a piezoelectric transducer to react with a tissue interface and produce an echo with truncated ringing.

Also, there is provided a formula to derive other electrical and mechanical waves which will cause a transducer to produce the ultrasonic waves described above.

DETAILED DESCRIPTION OF THE FIRST EMBODIMENT

Figure 2A:
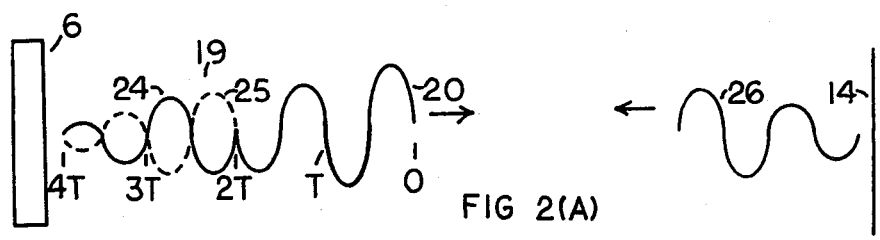
FIG. 2(a) shows transmitted, acoustic wave 19 utilized in the first embodiment of the invention, and an echo 26 caused by the collision of said wave with a tissue interface 14.

The first embodiment of the invention is shown in FIG. 2, and comprises ultrasonic wave 19. Ultrasonic wave 19 was produced when an electrical signal of similar shape or one described as a later embodiment of the invention, excited piezoelectric transducer 6. Wave 19 comprises a first part 20 and a second part 24. First part 20 is shaped like a damped sine wave with main frequency x; frequency x is between one and ten megahertz. Second part 24 is also shaped like a damped sine wave with main frequency x, and has lesser magnitude along its two cycles than does first part 20. Dashed curve 25 is the "continuation" of first part 20; continuation 25 is imaginary and simulates the phase of first part 20 if first part 20 were continued for another two cycles. The phase relationship of second part 24 was chosen such that second part 24 is 180 degrees out-of-phase with continuation 25 of first part 20. Note that the rightmost portion of wave 19 is transmitted first, and the leftmost portion last.

Figure 1A:
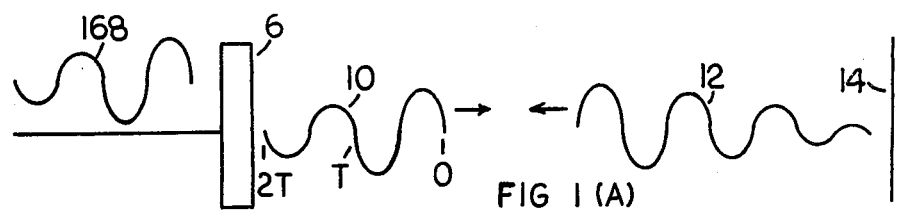
FIG. 1(a) shows a standard transmitted, acoustic wave 10, and a protracted echo 12 caused by the collision of said wave with a tissue interface 14.

Wave 19 travels first through a coupling medium and then into a specimen where it strikes tissue interface 14. The specimen can be a human fetus or an organ of the human body, and the tissue interface is any junction of two tissues of different densities. When transmitted wave 19 strikes tissue interface 14, echo 26 results. When compared to echo 12 produced by the interaction of standard, transmitted ultrasonic wave 10 with tissue interface 14 shown in FIG. 1(a), echo 26 shows truncated ringing; echo 12 rings for one and a half cycles longer (these two diagrams of echoes 12 and 26 are not drawn to scale of actual echoes, but demonstrate the way the invention operates).

The ringing of echo 26 is truncated for the following reasons: First part 20 strikes tissue interface 14 and causes it to mechanically vibrate; the vibration is a function of the elasticity of the tissues, and the vibration generates an echo which is "in phase" with the first part 20 (This is a selected frame of reference to designate the phase of the echo in relation to the first part 20). Then, second part 24 strikes the same tissue interface 14 at precisely the same location as did first part 20. Since second part 24 is 180 degrees out-of-phase with first part 20, second part 24 is 180 degrees out-of-phase with echo 26. As a result, vector addition results between the "momemtum" of second part 24 and echo 26, and the two cancel one-another out. This vector addition can also be termed, "interference".

This interference process can be described in other words: First part 20 sets tissue interface 14 in vibratory motion, and just before second part 24 arrived, most of the energy of the tissue interface 14 is in kinetic energy since the displacement of the tissue interface 14 is near zero and so, little energy is stored; the displacement is small because the shape of echo 26 approximates the displacement of tissue interface 14 (except for some lateral displacement), and echo 26 indicates zero displacement at the end of its cycle, when second part 24 arrives. Then, second part 24 arrives with its 180 degrees out of phase momemtum, and there is a near "head on crash" stopping the tissue "dead in its tracks". Thus, the tissue interface 14 stops ringing abruptly.

To achieve cancellation of the echo 26 caused by the first part 20, and little residual ringing due to second part 24, the energy of second part 24 must be approximately equal to the kinnetic energy of the vibrating, tissue interface 14 at the time that second part 24 strikes tissue interface 14. To accomplish this, the initial magnitude of second part 24 must be less than the initial magnitude of first part 20 since, by the time second part 24 arrives, much of the energy delivered by first part 20 to tissue interface 14 has been dissipated, and first part 20 has just ceased to deliver new energy.

To calculate the approximate, initial magnitude of second part 24, first measure the magnitude of standard protracted echo 12 as a function of time, and determine how much the magnitude decreases, in decibels, over two cycles. This amount, in decibels, is the amount by which the initial magnitude of second part 24 is less than the initial magnitude of first part 20 (since both first part 20 and second part 24 have the same degree of tapering, corresponding parts of the two parts also differ by said amount of decibels).

However, in practice, it is probably easier and more precise to design the electric driver of transducer 6 so that a potentiometer or other variable device controls the magnitude of second part 24. Then, after the desired magnitude of first part 20 is chosen, the magnitude of second part 24 is varied as images are made or as echoes are received from a single reflector, and the optimum magnitude is found by inspection—when the axial resolution of the image is optimized or the echoes are properly truncated.

Figure 1B:
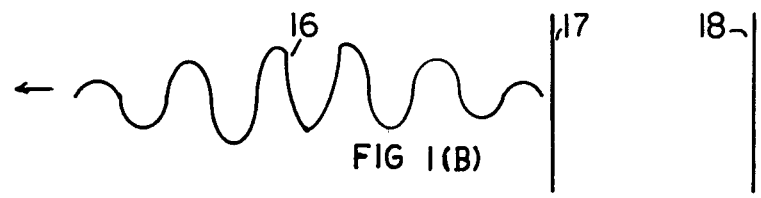
FIG. 1(b) shows an echo 16 cause by the collision of transmitted wave 10 with two, closely-spaced tissue interfaces, 17 and 18.
Figure 2B:
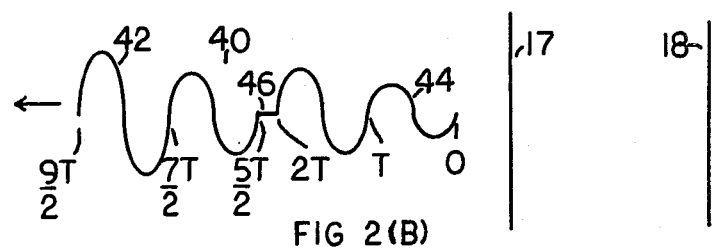
FIG. 2(b) shows an echo 40 caused by the collision of acoustic wave 19 with two, closely-spaced tissue interfaces 17 and 18.

This truncated echo is desirable for two reasons. First, the duration of the echo is proportional to the thickness of the lines in the image representing the tissue interface 14. Thus, an echo with short duration yields a narrow line and a sharp picture. The second reason is illustrated by FIG. 1(b) and FIG. 2(b). In FIG. 1(b), standard transmitted, ultrasonic wave 10 strikes closely spaced tissue interfaces 17 and 18. In response, each tissue interface, 17 and 18, produces a protracted echo such as echo 12, and the two echoes combine vectorally or "interfere" to yield resultant echo 16. Note that resultant echo 16 is not characteristic of either tissue interface 17 or 18, and so, echo 16 yields a blurred, distorted image of the tissue interfaces 17 and 18.

Next, examine FIG. 2(b) and echo 40 produced by the interaction of transmitted wave 19 with the two, closely-spaced tissue interfaces 17 and 18. First part 42 and second part 44 of echo 40 are distinct, characteristic, and nonoverlapping echoes from tissue interfaces 17 and 18 respectively. Thus, the visual image will contain two, distinct marks to represent each tissue interface 17 and 18. Note that first part 42 is similar to echo 26, and second part 44 is a scaled-down version due to the loss of energy of transmitted wave 19 when it passed through tissue interface 17 on its way to tissue interface 18. Since tissue interfaces 17 and 18 are separated from one-another by approximately two and a half cycles, and first parts 20 and 42 are only two cycles long, there exists a zero amplitude portion 46 in echo 40 between first part 42 and second part 44.

The truncation of first part 42 and second part 44 is caused in the same manner that echo 26 was truncated. Note that first part 20 and second part 24 of transmitted wave 19 are attenuated by like amounts, in decibels, as they travel through tissue interface 17 so their relative sizes are preserved as well as the subsequent cancellation.

In summary, the "formula" for the shape of transmitted wave 19 requires the 180 degree phase difference between the continuation 25 of first part 20, and second part 24, and the proper, relative magnitudes between first part 20 and second part 24, as described above. Also, both the first part 20 and second part 24 must have the same, main frequency.

A real tissue interface has irregular shape, and thus, echoes bounce off at varrying angles. However, since both first part 20 and second part 24 originate from the same source, and travel along the same path to the tissue interface, any vibration caused by first part 20 is cancelled by second part 24, and all the echoes are then suppressed. Many of the truncated echoes generated by first part 20 are collected by transducer 6 and summed; this works to the benefit of the imaging system provided there is proper focussing of the echoes by spherical curvature of transducer 6 or an appropriate acoustical lens.

Wave 19 can be produced by exciting transducer 6 with an appropriate electrical signal: an electrical signal proportional in magnitude and similar in frequency to wave 19, an electrical signal proportional in magnitude and similar in frequency and position to the first half, full, or three halves cycle of each the first part 20 and the second part 24, or two pulses, with width of each equal to T/2, one, positive going and beginning at time equal to zero and the second, negative going and beginning at time equal to 2T, and the first pulse having greater magnitude than the second pulse. When using the pulses, transducer 6 will inherently cause ringing to yield an ultrasonic wave similar to wave 19 since transducers are generally narrow band. See Lang, U.S. Pat. No. 4,333,347. Also, an electrical square wave with fundamental frequency similar to that of first part 20, having one to two cycles, and beginning its positive going portion at time equal to zero, and another such square wave beginning its negative going portion at time equal to 2T, can be used to excite transducer 6 and so produce wave 19. Again, the relatively narrow band of transducer 6 will filter out the higher harmonics of the square waves, leaving two segments of a sine wave. similar to first part 20 and second part 24.

When using any of the above described electrical signals to generate ultrasonic wave 19, second part 24 may have some extra, low magnitude ringing due to the ringing nature of transducer 6. But, this extra ringing will not pose too much of a problem since it has low energy and so, will not effect tissue interface 14 much. Possibly, the magnitude of second part 24 can be purposely reduced slightly to account for this extra energy at the end.

DETAILED DESCRIPTION OF THE SECOND EMBODIMENT

Figure 3:
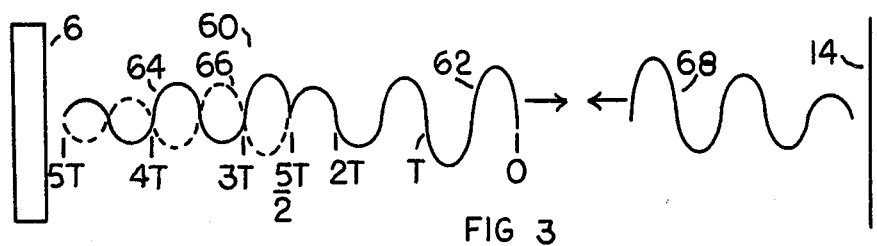
FIG. 3 shows transmitted, acoustic wave 60 utilized in the second embodiment of the invention, and resultant echo 68.

The second embodiment is shown in FIG. 3, and comprises ultrasonic wave 60. Wave 60 consists of first part 62 and second part 64; second part 64 is 180 degrees out-of-phase with continuation 66 of first part 62. Both first part 62 and second part 64 are tapered of "damped" sine waves with the same main frequency, and the initial magnitude of first part 62 is greater than the initial magnitude of second part 64. The relative magnitudes are derived as described in the description of the first embodiment.

Wave 60 operates to truncate the ringing of its echo 68 in a manner similar to that of the first embodiment; the only difference is that first part 62 comprises two and a half cycles instead of the two cycles of first part 20 of the first embodiment. Thus, echo 68 consists of two and a half cycles, also. To summarize this truncation process, first part 62 causes tissue interface 14 to vibrate, and so produce an echo, and then, second part 64 interferes with the vibration of tissue interface 14 to stop its vibration.

Because echo 68 has two and a half cycles, wave 60 can best resolve tissue interfaces that are spaced by at least two and a half cycles. The extra duration of first part 62 and second part 64 gives transducer 6 more time to ring down itself.

Wave 60 can be produced by exciting transducer 6 with an electrical signal that is similar in shape or proportional to wave 60, or by a pulse, positive going, beginning at time equal zero, and lasting for a time equal to T/2, plus another pulse, positive going, beginning at time equal to 5T/2 and lasting until 3T, or by electrical square waves or segments of sine waves, or by the technique described in the fifth and sixth embodiments. Using the first four techniques described above, second part 64 may have some additional, low magnitude ringing, but it is not harmful since its energy will be low.

Note that the same process that is used to stop the ringing of the target, tissue interface can be used to truncate the ringing of transducer 6: the first part of an electrical signal, said electrical signal is similar in shape to ultrasonic wave 60, excites transducer 6 causing transducer 6 to begin producing an ultrasonic wave and to begin ringing, and the second part of the electrical signal interferes with the vibration of transducer 6 to stop its vibration. Thus, a truncated, transmitted, ultrasonic wave with shape similar to echo 68 can be produced. Since the resultant transmitted, ultrasonic wave is truncated, the resultant echoes will have a shorter duration than if the transmitted wave was not truncated.

DETAILED DESCRIPTION OF THE THIRD EMBODIMENTS

Figure 4A:
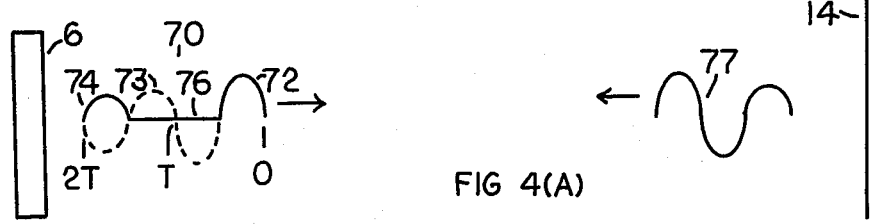
FIGS. 4(a)-(c) show three transmitted, acoustic waves 70, 88, and 94 utilized in the third embodiments of the invention and echo 77 caused by any one of said waves.
Figure 4B:
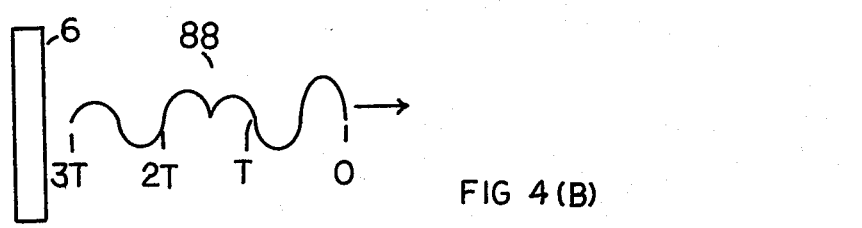
Figure 4C:
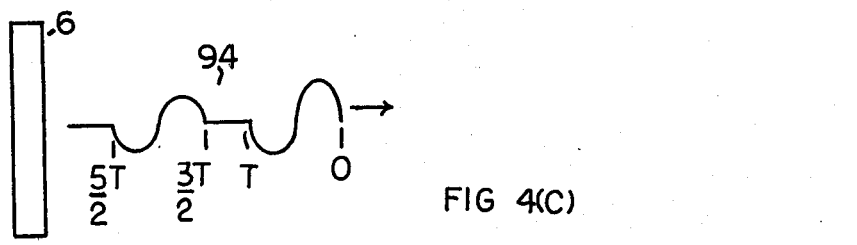

The third embodiments are shown in FIGS. 4(a)–(c), and comprise ultrasonic waves 70, 88, and 94. Wave 70 consists of first part 72, second part 74, and middle, zero-amplitude part 76. Second part 74 is 180 degrees out of phase with continuation 73 of first part 72.

When first part 72 strikes tissue interface 14 it sets tissue interface 14 in vibratory motion and causes a ringing echo. Then second part 74 arrives and interferes with the the vibratory motion of tissue interface 14 to stop it. Because second part 74 begins 3T/2 after first part 72, echo 77 is 3/2 cycles long. The magnitude of second part 74 is derrived as described in the description of the first embodiment.

Transmitted ultrasonic waves 88 and 94 are defined by the "formula" described in the description of the first embodiment, which defines its main frequency, magnitude, and position of the second part with respect to the first part. All three transmitted waves each yield echo 77.

The description of the first and second embodiments teach how to produce ultrasonic waves 70, 88, and 94.

DETAILED DESCRIPTION OF THE FOURTH EMBODIMENTS

Figure 5A:
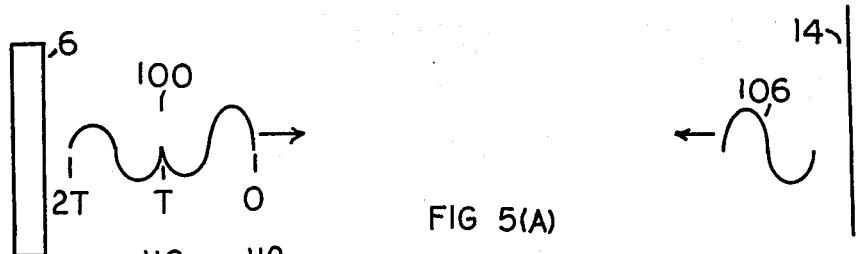
FIGS. 5(a) and (b) show two transmitted, acoustic waves 100 and 110 utilized in the fourth embodiment of the invention, and an echo 106 caused by any of said waves.
Figure 5B:
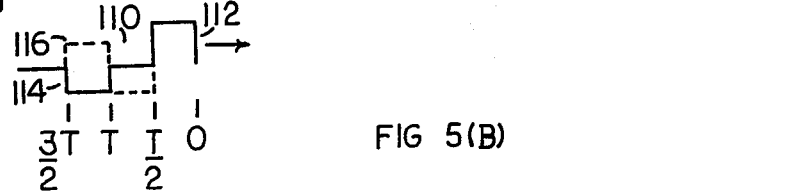

The fourth embodiments are shown in FIGS. 5(a)-(b), and comprise transmitted, ultrasonic waves 100 and 110. Wave 100 is defined by the "formula", and yields a one cycle long echo 106.

Wave 110 is also derived by the "formula" when pulses 112 and 114 are viewed as a segment of a square wave whose fundamental frequency equals 1/T. First part 112 has continuation 116 shown by the dashed squarewave. When first part 112 strikes tissue interface 14, it causes echo 106 which comprises primarily, the fundamental frequency of the square wave of which pulse 112 is one half cycle.

Transmitted, ultrasonic wave 100 can be produced according to the teachings of the first and second embodiment. But, to produce ultrasonic wave 110, a proportional, two pulse electrical signal must excite transducer 6, and transducer 6 must have large bandwidth. In practice, transducer will exhibit some ringing and so, yield a tail to first part 112 and second part 114, and some rounding to pulse 112 and pulse 114.

As indicated by the above descriptions of the first, second, third, and fourth embodiments, the duration of the first and second parts can vary. In fact, the durations of each part can be substantially longer than the two and a half cycles shown in FIG. 3. The first part can be of any length, any number of cycles, as long as the "formula" is used to derive the appropriate second part; the continuation of the first part must be substantially 180 degrees, out-of-phase with the second part, both the first and second parts have the same base frequency, and the magnitude of the second part as a function of time is less than the magnitude of the first part, as derived above. Longer duration first and second parts may be necessary if the transducer exhibits too much inherent ringing or too narrow a bandwidth to make the sharp transition from the end of the first part to the beginning of the second part; the extra duration of the first part allows the transducer time to dissipate its vibrations caused by the first part. There can be a period in-between the first and second parts as shown in FIG. 4(c) to allow this ring down of the transducer.

It is not necessary that the first part end at a zero crossing of its cycle, or that the second part begin at a zero crossing of its cycle; each can begin and end at any phase in their cycle as long as the continuation of the first part is substantially 180 degrees out-of-phase with the second part.

DETAILED DESCRIPTION OF THE FIFTH EMBODIMENT

Figure 6A:
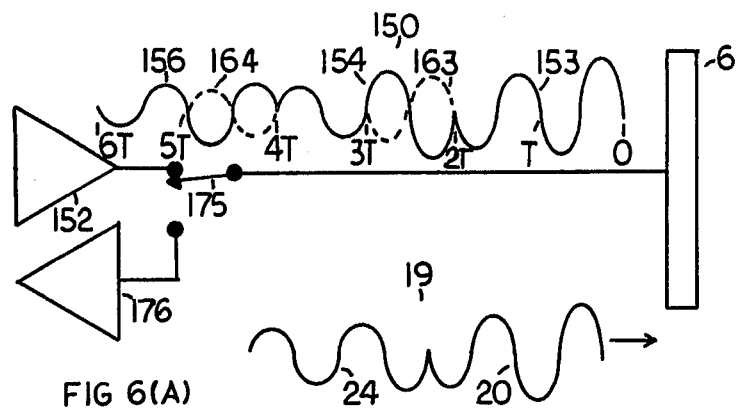
FIGS. 6(a) and (b) show electrical signals 150 and 151 driving transducer 6 in accordance with the fifth embodiments of the invention.
Figure 6B:
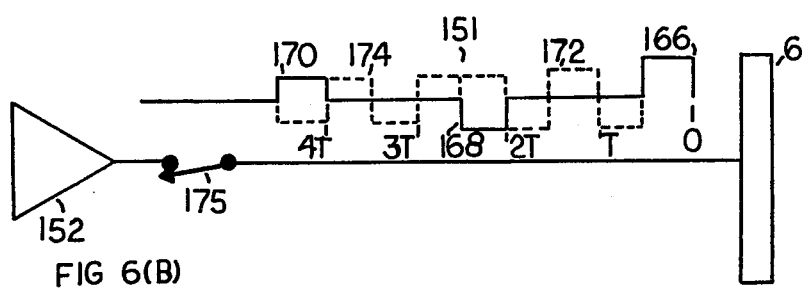

The fifth embodiments are shown in FIGS. 6(a)-(b), and comprise electrical signals 150 and 151. Electrical signals 150 and 151 are generated by electronic amplifier 152 which is driving transducer 6. The purpose of electrical signals 150 and 151 is to cause transducer 6 to produce transmitted, ultrasonic wave 19 of the first embodiment. One or the other of electrical signals 150 or 151 is used to produce ultrasonic wave 19.

Electrical signal 150 consists of first part 153, second part 154, and third part 156, all of which have the same base frequency and resemble a tapered or "damped" sine wave. Also, continuation 163 of first part 153 is 180 degrees out-of-phase with second part 154, and continuation 164 of second part 154 is 180 degrees out-of-phase with third part 156. Said "continuations" are derrived as in the prior embodiments.

The initial magnitude of second part 154 is less than the initial magnitude of first part 153, and their relative size differences are derrived as follows: The magnitude of a standard ultrasonic wave such as ultrasonic wave 10 is measured as a function of time, and the decrease, in decibels, over two cycles is calculated; ultrasonic wave 10 was produced by transducer 6 when transducer 6 was excited by electrical signal 168 which is similar to first part 153. The initial magnitude of second part 154 equals the initial magnitude of first part 153 reduced by said amount of decibels, but increased by enough decibels so that said increase has enough power by itself to cause transducer 6 to produce second part 24. Thus, second part 154 of electrical signal 150 will have enough total power to truncate the ringing of transducer 6 due to the excitation of first part 153, and to cause transducer 6 to begin to vibrate 180 degrees out-of-phase to how it was vibrating due to first part 153. Due to the finite bandwidth of transducer 6, this 180 degrees phase shift cannot occur instantaneously, but FIG. 6 represents the desired, optimum result.

Third part 156 has large enough magnitude just to truncate the ringing of transducer 6 due to second part 154. Thus, the initial power of third part 156 equals the excess power of second part 154 (that power over and above the power needed to truncate the ringing caused by first part 153) reduced by the amount of decibels that a standard ultrasonic wave dissipates in two cycles when left to ring. In practice, however, it will be easier to have the magnitude of second part 154 and third part 156 controlled by a potentiometer or other variable control; then, second part 154 is increased in power until echoes caused by the ultrasonic, transmitted wave have substantially truncated ringing, the best that can be achieved with this two-part electrical signal. Then, third part 156 is turned-on, and its magnitude increased until the ringing of said echo more completely truncates.

Electrical wave 151 can be used in place of electrical signal 150 to generate ultrasonic wave 19. Electrical signal 151 consists of first part 166, second part 168, and third part 170. Second part 168 is 180 degrees out-of-phase with continuation 172 of first part 166, and third part 170 is 180 degrees out-of-phase with continuation 174 of second part 168. The magnitudes of each parts are determined as above. Each part of wave 151, a pulse, is considered to be one-half wavelength of a square wave to derrive their continuations.

Echoes received by transducer 6 in response to ultrasonic wave 19 are transformed to an electrical signal by transducer 6. While transducer 6 is receiving echoes, switch 175 is in the down position so that electronic driver 152 is disconnected from transducer 6, and electronic receiver 176 is connected to transducer 6. Thus, electronic receiver 176 receives the electrical signals generated by transducer 6 in response to the echoes. Receiver 176 amplifies said electrical signals for use in producing the image.

Each part of wave 151 may have rounded edges and some ringing due to the finite bandwidth of transmitter 152 and transducer 6.

DETAILED DESCRIPTION OF THE SIXTH EMBODIMENTS

Figure 7A:
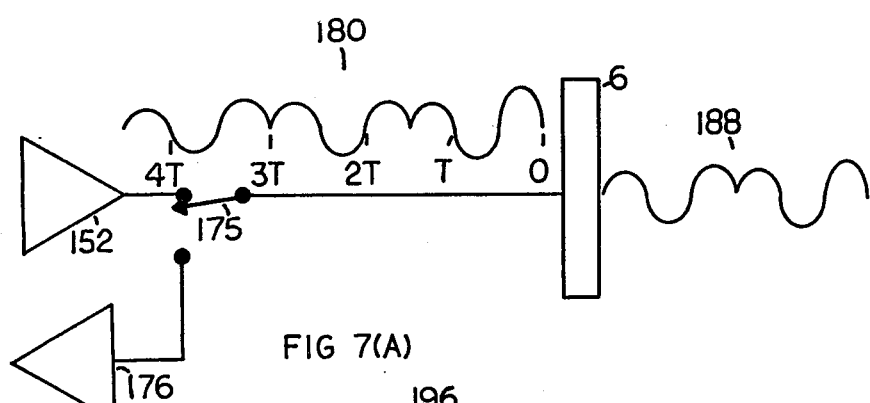
FIGS. 7(a) and (b) electrical signals 180 and 196 driving transducer 6 in accordance with the sixth embodiments of the invention.
Figure 7B:
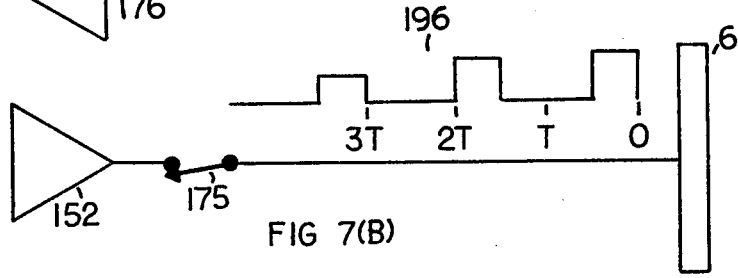

The sixth embodiments are shown in FIGS. 7(a)-(b), and comprise electrical signals 180 and 196. Their parameters are derrived as taught by the fifth embodiment except that the second and third parts of wave 180 and wave 196 begin 3T/2 after their respective first and second parts begin and so, cause a transmitted, ultrasonic wave 188 whose first and second parts are each 3/2 wavelengths long.

In other embodiments of the invention, electrical signals having three parts, each of more than two wavelengths in length can be used. The formula which defines their parameters requires that each part have the same base frequency, the continuation of the first part is substantially out-of-phase with the second part and preferrably 180 degrees out-of-phase, and the continuation of the second part is substantially, and preferrably 180 degrees, out-of-phase with the third part. Then, the relative magnitudes can be derived by experimentation as described above or by the calculations as described above in the Detailed Description of the Fifth Embodiment.

Also, according to similar teachings, electrical signals having three parts, each of less than 3/2 wavelength can be used.

In any of the embodiments for the electrical signals, it is not crucial that the parts begin or end at the zero portion of their cycle, rather, they can begin and end at any phase as long as the phase relationships as defined by the formula are maintained.

DETAILED DESCRIPTION OF THE SEVENTH EMBODIMENTS

The seventh embodiments are similar to the previous six embodiments except in the seventh embodiment, the second parts are not exactly 180 degrees out-of-phase with the continuation of the respective first parts. Rather, the second parts are less or greater than 180 degrees out-of-phase with the continuations. To determine how much less or greater than the 180 degrees, a mechanical model of the tissue can be computed:

$$\text{Force} = \text{Mass} \cdot dv/dt + \text{friction} \cdot v + \text{spring constant} \cdot \text{displacement}$$

where "v" equals the velocity of the tissue when forced by the transmitted, ultrasonic wave.

From this equation, the displacement of the tissue in relation to the phase of the transmitted, ultrasonic wave can be computed. Then, the phase of the second part can be made to be 180 degrees out-of-phase with the displacement of the tissue.

In practice, however, it will be better to build electronic circuitry so that a potentiometer or other variable component controls the starting point of the second part; then, beginning at 180 degrees out-of-phase with the continuation of the first part vary the phase, plus or minus, until the echoes show optimum, truncated ringing or until the image is optimized.

Similarly, the phase of the third part (if there is a third part) is not exactly 180 degrees out-of-phase with the phase of the continuation of the second part. The amount of deviation from the 180 degrees phase difference is determined as was done with the phase of the second embodiment.

To vary the phase of the second or third parts, the starting phases of each wave can be varied, or the second or third waves can begin at zero crossings, but sometimes after or before the previous wave made a zero crossing.

I claim:

1. A process for causing an interface to vibrate and then truncating resultant ringing of the interface, comprising:
    transmitting an acoustic wave towards the interface, said acoustic wave comprising first and second parts, each part having approximately the same main frequency, and the second part being transmitted at a time after the first part such that an imaginary continuation of the first part would be substantially out-of-phase with the second part, and such that the second part reaching the interface while the interface is still significantly ringing from the first part.

2. The process of claim 1 wherein said first part comprises a segment of an ultrasonic wave and said second part comprises a segment of an ultrasonic wave.

3. The process of claim 1 wherein said first and second parts comprise segments of one damped sine wave.

4. The process of claim 1 wherein said imaginary continuation of the first part is approximately one hundred eighty degrees out-of-phase with said second part.

5. The process of claim 2 wherein said imaginary continuation of the first part is approximately one hundred eighty degrees out-of-phase with said second part.

6. The process of claim 1 wherein the initial power of said first part is greater than the initial power of said second part.

7. The process of claim 5 wherein the initial power of said first part is greater than the initial power of said second part.

8. The process of claim 7 wherein the duration of the first part equals an integral multiple of one-half the wavelength of said sine wave.

9. A process for exciting a piezoelectric transducer and then truncating resultant ringing of the transducer, comprising:
    exciting a piezoelectric transducer with an electrical signal,
    said electric signal comprising first and second parts, each part having approximately the same main frequency, and said second part being transmitted at a time after said first part such that an imaginary continuation of said first part would be substantially out-of-phase with said second part, and such that the second part reaches the transducer while the transducer is still significantly ringing from the first part.

10. The process of claim 9 wherein said first and second parts comprise segments of one sine wave.

11. The process of claim 9 wherein said first and second parts comprise segments of one damped sine wave.

12. The process of claim 9 wherein said imaginary continuation of the first part is approximately one hundred eighty degrees out-of-phase with said second part.

13. The process of claim 9 wherein said first and second parts comprise segments of one damped sine wave, and wherein said imaginary continuation of said first part is approximately one hundred eighty degrees out-of-phase with said second part.

14. The process of claim 9 wherein the initial power of said first part is greater than the initial power of said second part.

15. A process for causing an interface to vibrate and then truncating resultant ringing of the interface, comprising:

aiming a piezoelectric transducer towards the interface, and exciting the piezoelectric transducer with an electrical signal, said electrical signal comprising first, second, and third parts, each part having approximately the same main frequency, and said second part being transmitted at a time after said first part such that an imaginary continuation of said first part would be substantially out-of-phase with said second part, and such that the second part reaches the transducer while the transducer is still significantly ringing from the first part, and said third part being transmitted at a time after said second part such that an imaginary continuation of said second part would be substantially out-of-phase with said third part, and such that the third part reaches the transducer while the transducer is still significantly ringing from the second part.

16. The process of claim 15 wherein said first, second, and third parts comprise segments of one sine wave.

17. The process of claim 15 wherein said first, second, and third parts comprise segments of one damped sine wave.

18. The process of claim 15 wherein said first, second, and third parts comprise segments of one square wave.

19. The process of claim 15 wherein said imaginary continuation of the first part is approximately one hundred eighty degrees out-of-phase with said second part, and said imaginary continuation of the second part is one hundred eighty degrees out-of-phase with said third part.

20. The process of claim 17 wherein said imaginary continuation of the first part is approximately one hundred eighty degrees out-of-phase with said second part, and said imaginary continuation of the second part is approximately one hundred eighty degrees out-of-phase with said third part.

* * * * *